US 9,188,451 B2
Nov. 17, 2015

(12) United States Patent
Magnusson et al.

(10) Patent No.: US 9,188,451 B2
(45) Date of Patent: Nov. 17, 2015

(54) METHOD AND APPARATUS FOR MINIMIZING POWER CONSUMPTION IN A NAVIGATION SYSTEM

(71) Applicant: NAVTEQ B.V., Veldhoven (NL)

(72) Inventors: Birgir Magnusson, Sipoo (FI); Marko Tapio Tuukkanen, Schlenzer (DE)

(73) Assignee: HERE Global B.V., Veldhoven (NL)

( * ) Notice: Subject to any disclaimer, the term of this patent is extended or adjusted under 35 U.S.C. 154(b) by 1 day.

(21) Appl. No.: 13/781,077

(22) Filed: Feb. 28, 2013

(65) Prior Publication Data

US 2014/0244156 A1 Aug. 28, 2014

(51) Int. Cl.
G06G 7/78 (2006.01)
G01C 21/34 (2006.01)
G01C 21/30 (2006.01)

(52) U.S. Cl.
CPC .............. *G01C 21/34* (2013.01); *G01C 21/30* (2013.01)

(58) Field of Classification Search
None
See application file for complete search history.

(56) References Cited

U.S. PATENT DOCUMENTS

| 6,560,531 | B1 | 5/2003 | Joshi | |
| 2002/0052674 | A1* | 5/2002 | Chang et al. | 700/300 |
| 2012/0283947 | A1* | 11/2012 | T'Siobbel | 701/469 |
| 2012/0289244 | A1 | 11/2012 | Goyal | |
| 2013/0060459 | A1* | 3/2013 | Thach et al. | 701/400 |

FOREIGN PATENT DOCUMENTS

| EP | 0393935 A2 | 10/1990 |
| WO | 2012084003 A1 | 6/2012 |

OTHER PUBLICATIONS

International Search Report for International Application No. PCT/EP2014/050343, mailed Apr. 28, 2014, 4 pages.
Notification of Transmittal of the International Search Report and the Written Opinion of the International Searching Authority, or the Declaration along with Written Opinion for International Application No. PCT/EP2014/050343, mailed Apr. 28, 2014, 9 pages.

* cited by examiner

*Primary Examiner* — Thomas Tarcza
*Assistant Examiner* — Garrett Evans
(74) *Attorney, Agent, or Firm* — Ditthavong & Steiner, P.C.

(57) ABSTRACT

An approach is provided for providing mechanisms to minimize power consumption in a navigation system while allowing for various levels of functionality and accuracy. A device may process telematics information and/or sensor information associated with at least one vehicle to determine an estimated location of the vehicle. Then the device may cause a comparison of the estimated location against available mapping data. Further, the device may determine whether to determine a sensed location of the vehicle via one or more location sensors based, at least in part, on the comparison.

20 Claims, 11 Drawing Sheets

METHOD AND APPARATUS FOR MINIMIZING POWER CONSUMPTION IN A NAVIGATION SYSTEM

BACKGROUND

Service providers (e.g., wireless, cellular, etc.) and device manufacturers are continually challenged to deliver value and convenience to consumers by, for example, providing compelling network services. One area of development has been proliferation of various sensors; for example, location, magnetometer, accelerometer, speedometer, personal, and the like sensors, that are included in various devices (e.g., mobile phones, tablets, automobiles, computers, etc.), which provide a wide range of services to users. For instance, a location sensor (e.g., a global positioning system (GPS) receiver) may be used for navigation purposes while a user is walking, driving, boating, biking, hiking, etc., or a magnetometer may be used to indicate direction of a user or a device movement, or an accelerometer in a mobile device may be used to interface with and play certain electronic games, and the like. However, as users increase use of their devices and the associated sensors, power requirements at the devices and at the sensors may limit duration of and/or functionalities of the devices for the users. Accordingly, service providers and device manufacturers face significant challenges to providing efficient power saving schemes for a device and its sensors.

SOME EXAMPLE EMBODIMENTS

Therefore, there is a need for providing mechanisms to minimize power consumption in a navigation system while allowing for various levels of functionality and accuracy.

According to one embodiment, a method comprises processing and/or facilitating a processing of telematics information, sensor information, or a combination thereof associated with at least one vehicle to determine an estimated location of the vehicle. The method also comprises causing, at least in part, a comparison of the estimated location against mapping data. The method further comprises determining whether to determine a sensed location of the vehicle via one or more location sensors based, at least in part, on the comparison.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of telematics information, sensor information, or a combination thereof associated with at least one vehicle to determine an estimated location of the vehicle. The apparatus is also caused to cause, at least in part, a comparison of the estimated location against mapping data. The apparatus is further caused to determine whether to determine a sensed location of the vehicle via one or more location sensors based, at least in part, on the comparison.

According to another embodiment, a computer-readable storage medium carrying one or more sequences of one or more instructions which, when executed by one or more processors, cause, at least in part, an apparatus to process and/or facilitate a processing of telematics information, sensor information, or a combination thereof associated with at least one vehicle to determine an estimated location of the vehicle. The apparatus is also caused to cause, at least in part, a comparison of the estimated location against mapping data. The apparatus is further caused to determine whether to determine a sensed location of the vehicle via one or more location sensors based, at least in part, on the comparison.

According to another embodiment, an apparatus comprises means processing and/or facilitating a processing of telematics information, sensor information, or a combination thereof associated with at least one vehicle to determine an estimated location of the vehicle. The apparatus also comprises means for causing, at least in part, a comparison of the estimated location against mapping data. The apparatus further comprises means for determining whether to determine a sensed location of the vehicle via one or more location sensors based, at least in part, on the comparison.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing mechanisms to minimize power consumption in a navigation system while allowing for various levels of functionality and accuracy. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term a "host device," and a "host" can refer to a device which may include a navigation module and/or a navigation device. For example, various mobile devices such as a mobile phone, a tablet, a laptop computer, and the like may include a navigation device which may include a navigation module. In another example, an electronics system in/on a vehicle (e.g., a car, a boat, a plane, a motorbike, etc.) may include a navigation device and/or a navigation module. In various embodiments, a host device may provide one or more functionalities to one or more devices, which may be implemented in and/or via the host device.

It is noted that embodiments of the approach described herein are applicable to any type of sensor and/or instruments, which may include digital and/or analog instrument panels, environmental sensors, sensors for physical properties, location sensors, personal sensors, wireless sensors, wired sensors, virtual sensors, network sensors, and the like.

Figure 1:
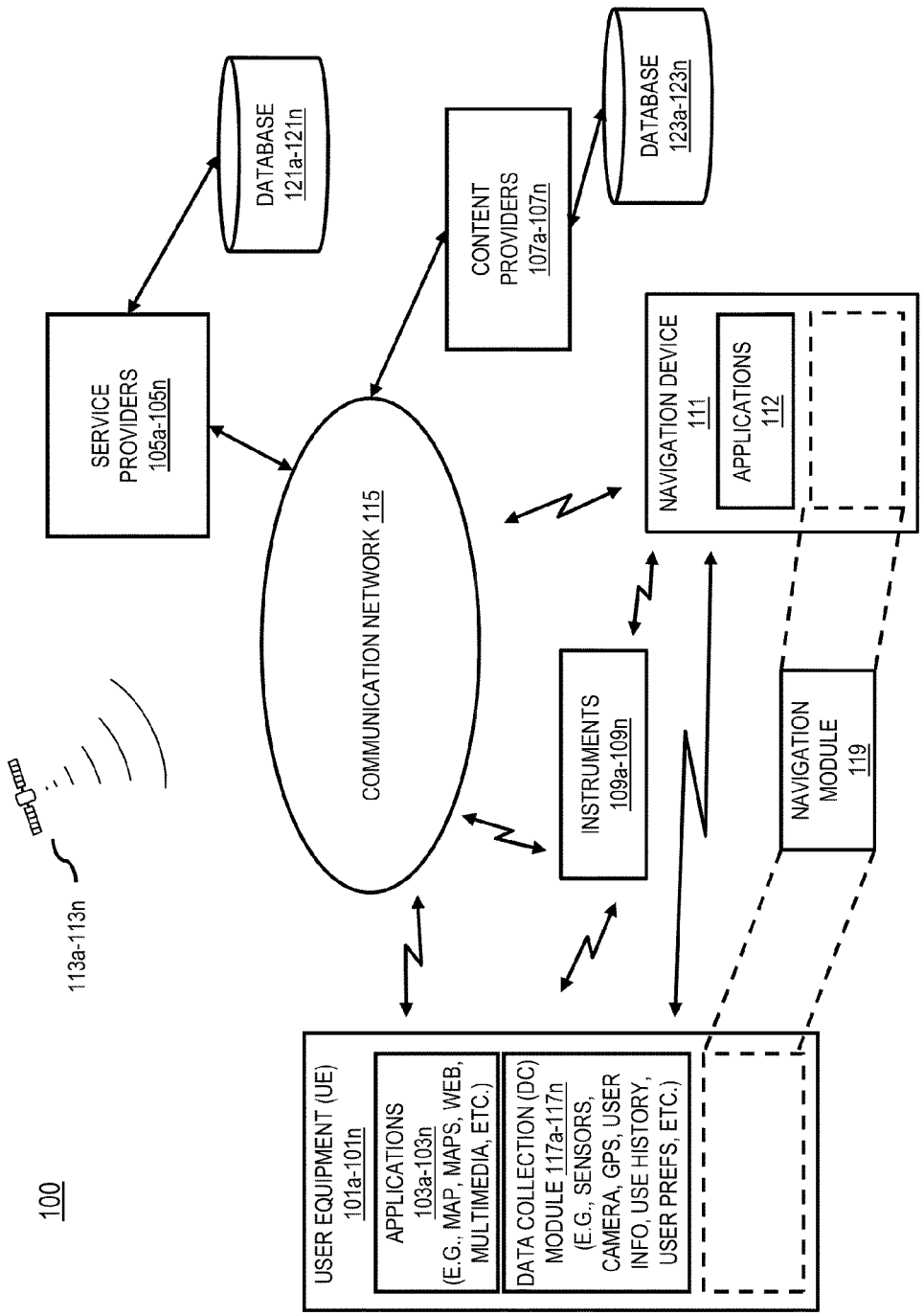
FIG. 1 is a diagram of a system capable of providing mechanisms to minimize power consumption in a navigation system while allowing for various levels of functionality and accuracy, according to an embodiment.

FIG. 1 is a diagram of a system capable of providing for mechanisms to minimize power consumption in a navigation system while allowing for various levels of functionality and accuracy, according to an embodiment. As discussed above, with proliferation of available sensors (e.g., location sensors, thermometers, health and wellness sensors, wireless communication sensors, etc.) on electronic devices, individuals utilize a range of these devices (e.g., smartphones, tablets, navigation devices, laptop computers, etc.), which may include various applications, firmware, software, etc., for various tasks and purposes. Further, these devices may be utilized in various settings and places, for example, at home, at the office, in/on a vehicle (e.g., a car, a boat, a plane, a bike, etc.), and the like. However, as the devices have become more powerful and feature rich, they may utilize more power to provide the functionalilties the users have become accustomed to. In many instances the devices may be powered by batteries, or may have limited power supply, and/or the user may wish for the device to operate as efficiently as possible in order to minimize power usage, however, the devices may still be expected to provide certain levels of functionality and accuracy. In one scenario, a device may be utilized in/on a vehicle with limited power source and/or where the user may wish to conserve energy. For example, the device may use power from the vehicle's battery, which may cause utilization of additional resources of the vehicle (e.g., additional fuel, charging equipment, etc.) to recharge the vehicle's battery. In some instances, the power supply in a vehicle may not be able to provide adequate power that may be required by a device where the device may be functioning in a high-power mode in order to provide the functionalities in use by the user. For example, a user may utilize device for several functions at the same time (e.g., audio, video, Internet, navigation, etc.) where the device may require 1.5 A in order for required circuitry in the mobile device to function; however, if a vehicle's power system can only provide 1.0 A, then the device will use the remaining required power from its own battery where at some point the battery will be depleted of electrical charge. In one example, the vehicle itself may be an electric vehicle (e.g., an electric car, an electric motorbike, an electric boat, etc.), which may rely on limited resources (e.g., batteries, fuel, etc.) to power the vehicle, devices, systems, instruments, and the like utilizing the vehicle's power sources, wherein if inefficient power consumption can affect the vehicle's operating duration and range. Thereof or, there is a need to provide for efficient mechanisms to minimize power consumption by various devices, systems, and/or sensors, for example a navigation system, while allowing for various levels of functionality and accuracy.

To address, at least these problems, a system 100 of FIG. 1 presents the capability to provide for mechanisms to minimize power consumption by various devices, systems, and/or sensors, for example a navigation system, while allowing for various levels of functionality and accuracy. More specifically, the system 100 of FIG. 1 introduces the capability of varying functionalities of certain sensors and devices in the system 100 to minimize power consumption and achieve power savings while the sensors and the devices are still capable of providing certain levels of functionalities while within certain levels of accuracy and/or deviation thresholds. In one instance, a user may utilize a device, which may include one or more location sensors, for positioning and navigation purposes, wherein the location sensors may be in communication with one or more satellite-based positioning systems (e.g., GPS, Global Navigation Satellite System (GLEANS), etc.), a network-assisted and/or a roadside positioning system, and the like. In various embodiments, the system 100 may vary operation modes of various devices and sensors by enabling and/or disabling certain features and functionalities of the devices and/or the sensors. For example, it is possible that not all sensors of a device need to be functioning continuously and/or at the same time in order for the device to be able to provide a default or a requested functionality.

Modern vehicles can, for example, provide access to in-vehicle sensor data associated with location (e.g., GPS), distance traveled, velocity, acceleration, wheel angle, compass heading, and the like. Additionally, that information may be made available via other user devices in the vehicle, for example, navigation device, smart phones, tablets, laptop computers, etc. Some of the user devices or embedded in-vehicle devices include accurate and up-to date map data, which may be utilized to provide navigation services. In one embodiment, to minimize power consumption, one or more location sensors of a navigation system may be put into a low power mode, a sleep mode, a suspended mode, and the like while positioning and/or navigation functionalities still may be provided. In one use case scenario, a user may utilize a navigation system in a vehicle where the navigation system may acquire a current location and/or navigation information from a satellite-based and/or a network-assisted positioning system for determining a navigation route (route), which may be presented to a user via one or more user interface mechanisms on one or more user devices in/on the vehicle. Further, the navigation system may determine various navigation information (e.g., from a mapping data) associated with the route, for example, a distance from a current location to a destination, or to a checkpoint, or to a point of interest (POI), or to a navigation event (e.g., a left/right/U turn), and the like. Furthermore, the navigation information may include traffic information, available alternate routes, road conditions, cross roads, possible exits, and the like. In one use case scenario, once a current location and/or a route information is retrieved and/or determined from one or more external sources (e.g., GPS, a service provider, etc.), any additional information, calculations, determinations, etc. may be performed by one or more local devices and/or sensors.

In one embodiment, a navigation device in a vehicle and/or on a user device (e.g., a mobile device) may have determined a current location of the vehicle/device and may further determine one or more movement information items associated with the vehicle for presenting a change of location to the user. In one embodiment, the navigation device may determine a distance on a route, over which distance, the navigation device may locally determine movement information of the navigation device (e.g., in/on a vehicle) and present location information (e.g., utilizing mapping data) before accessing/requesting external location information (e.g., GPS location), wherein location sensors of the navigation device may be put in a sleep mode of operation for power savings and/or efficiency. In various embodiments, the navigation device may utilize various information items available from various sensors/instruments/gauges of a vehicle for determining a movement, a direction, a speed, and the like. For example, the information items may be available from an odometer, a speedometer, a steering control, a compass, a gyroscope, a pedometer, and the like.

In one instance, one or more sensors of a vehicle may determine and indicate that the vehicle, from an initial location, begins travelling straight on a segment of a route, then makes a left/right turn at some point along the route, travels straight on another segment along the route, then makes another left/right turn at some point along the route, and then stops at some point (e.g., a POI), a destination point, etc.) on the route. In one embodiment, a navigation system in the vehicle may utilize a location sensor to determine the initial location, utilize an odometer data to determine one or more distances of the one or more segments traveled along the route or stopping point, and utilize one or more steering control sensors to determine the one or more turns along the route. In one embodiment, the navigation device may be integrated with a vehicle's onboard instrumentation system. In one embodiment, the navigation device may be integrated into a user device, for example, a mobile phone, a tablet, a laptop computer, and the like, wherein the user device may communicate with a vehicle's onboard instrumentation system, for example, via one or more wireless and/or wired communication channels. In one embodiment, the navigation device may be a device dedicated for navigation services, wherein it may communicate with the vehicle's onboard instrumentation system, one or more other user devices, and the like, for example, via one or more wireless and/or wired communication channels.

In one embodiment, one or more devices of the vehicle (e.g., in-vehicle navigation system) may have a capability to communicate (e.g., via cellular, WLAN, etc.) with one or more external service and/or content providers (cloud services), which may provide offline and/or online navigation information. For example, an in-vehicle navigation system may turn off its one or more location sensors for communicating with one or more satellite service providers (e.g., GPS, GLEANS, etc.) to save power (e.g., battery), but still, the in-vehicle navigation system may maintain a connection to the cloud services for requesting and transmitting navigation (e.g., distance traveled, turns, etc.) and other information (e.g., from other sensors) to the cloud services. In one embodiment, the cloud services may utilize the navigation and the other information to analyze via the cloud services to identify any unexpected maneuvers (e.g., an unexpected turn), wherein the cloud services may then trigger the in-vehicle navigation system to turn on the one or more offline location sensors (e.g., GPS sensors) so that the in-vehicle navigation system may request and receive accurate location information from the satellite service providers. In one embodiment, the cloud services may provide the accurate location information to the in-vehicle navigation system in addition to or instead of the location information from the satellite service providers. In one embodiment, once the in-vehicle navigation system determines a current accurate location information (e.g., from the satellite service providers, it may then turn off the one or more location sensors to save power. In one embodiment, the in-vehicle navigation system may utilize one or more proximity communication channels (e.g., Bluetooth®, near field communications (NFC), etc.) to communicate with a nearby user device (e.g., a mobile phone in the car), wherein the in-vehicle navigation system may determine/request the accurate (e.g., GPS) location information from the user device instead of using its own location sensors (e.g., GPS sensors) for obtaining the accurate information.

In one embodiment, a navigation device may utilize the methods of the system 100 even when a user is not actively using/accessing the navigation device. For example, in some vehicles, once a vehicle is being utilized for travelling, an available navigation device may begin presenting location and navigation information on a UI display, wherein the location sensors may be continuously communicating with external location positioning sources and services. In a scenario where a user does not necessarily need the positioning information (e.g., driving to a known destination, driving in a local neighborhood, etc.), an available navigation device may initiate an inactive mode of operation for one or more location sensors used for communicating with external sources and services and instead utilize local map data and vehicle travel/ movement data to determine and present the current vehicle location. In one embodiment, the navigation device may activate the location sensors at predefined intervals to obtain real-time positioning data from external sources and services for more accurate updates of vehicle location information. In one embodiment, the navigation system may determine a potential deviation and/or accuracy of a current location of a navigation device/vehicle with reference to mapping data and if the potential deviation and/or accuracy meets a certain threshold value, then the navigation system may determine to activate one or more location sensors for communicating with one or more external sources (e.g., GPS) and for determining an accurate current location of the navigation device/vehicle.

As shown in FIG. 1, in one embodiment, the system 100 includes user equipment (UE) 101a-101n (also collectively referred to as a UE 101 and/or UEs 101), which may be utilized to execute one or more applications 103a-103n (also collectively referred to as applications 103) including navigation application, games, social networking, web browser, media application, user interface (UI), map application, web client, etc. to communicate with other UEs 101, one or more service providers 105a-105n (also collectively referred to as service provider 105), one or more content providers 107a-107n (also collectively referred to as content providers 107), one or more instruments/sensors 109a-109n (also collectively referred to as the instruments 109), a navigation device 111, one or more satellites 113a-113n (also collectively referred to as the satellite system 113), and/or with other components of a communication network 115 directly and/or over the communication network 115. In one embodiment, the UEs 101 may include data collection modules 117a-117n (also collectively referred to as DC module 117) for determining and/or collecting data associated with the UEs 101, one or more sensors of the UE 101, one or more users of the UEs 101, applications 103, one or more content items, and the like.

In one embodiment, a UE 101 may include a navigation module 119, which may include one or more sensors and/or modules for determining, requesting, and/or accessing one or more navigation information items for providing location and navigation services, wherein the navigation information may include mapping data, movement direction, geo-location, and the like. In addition, the UE 101 can execute an application 103 that is a software client for storing, processing, and/or forwarding the navigation information to other components of the system 100. In one embodiment, the navigation module 119 may be implemented in a navigation device 111, wherein the navigation device 111 may communicate with any entity of the system 100 either directly and/or via the communication network 115. In one embodiment, the navigation device 111 may communicate with the instruments 109 for requesting one or more navigation information items available from the instruments 109. In one embodiment, the instruments/ sensors 109 may include various instruments and sensors, which are associated with a vehicle (e.g., a car, a bike, a motorcycle, a boat, etc.) In one embodiment, the navigation device 111 and/or the navigation module 119 may be implemented as one or more components of a vehicle's electronics system. In various embodiments, the navigation module may be implemented in various host devices (host), wherein a host may provide one or more functionalities to implement the navigation module 119. In one embodiment, the navigation device 111 may include one or more applications 112, for example, including navigation application, games, social networking, web browser, media application, user interface (UI), map application, web client, etc. to communicate with the UEs 101, the service providers 105, the content providers 107, the instruments 109, one or more other navigation devices, the satellite system 113, and/or with other components of a communication network 115 directly and/or over the communication network 115.

In one embodiment, the service providers 105 may include and/or have access to one or more databases 121a-121n (also collectively referred to as database 121), which may include various mapping data, user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, navigation services, location based services, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like.

In one embodiment, the content providers 107 may include and/or have access to one or more database 123a-123n (also collectively referred to as database 123), which may store, include, and/or have access to various content items. For example, the content providers 107 may store content items (e.g., at the database 123) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the UEs 101 may interact with the instruments 109, wherein the UEs 101 and/or the instruments 109 may include a combination of various sensors, for example, one or more wearable sensors, accelerometers, odometer sensors, steering control sensors, speedometer sensors, magnetometer sensors, vehicle diagnostic sensors, vehicle information sensors, and the like. By way of example, connectivity between the UEs 101, the navigation device 111, and/or the instruments 109 may be facilitated by short range wireless communications, for example, NFC protocol, Bluetooth®, WLAN, MirrorLink™, ANT/ANT+™, ZigBee®, etc. and/or via a wired communication bus/hub, a universal serial bus (USB) data port, and the like.

In one embodiment, the navigation module may include one or more sensors (e.g., a steering control, a microphone, a camera, an accelerometer, GPS receiver, a magnetometer, etc.) for monitoring and/or collection of sensor data. For example, the sensors may continuously and/or at periodic intervals capture odometer, steering control angle/direction, accelerometer, speedometer, magnetometer, and the like information. The UEs 101 (e.g., via the application 103), the DC module 117, and/or the navigation module 119) may store the data temporarily, perform any needed processing and/or aggregation, and send the data to the service providers 105 continuously and/or at periodic intervals. In one embodiment, the data sent includes, at least in part, timestamps, sensor data (e.g., vehicle data, environmental data, etc.), and/or context information. By way of example, the operational states of the sensors on the UEs 101 and/or the navigation device 111 may include setting and/or modifying of related operational parameters including sampling rate, parameters to sample, transmission protocol, activity timing, etc. By way of example, the UEs 101 and/or the navigation device 111 may include one or more components for providing adaptive filtering of sensors and/or sensor data, for example, by executing at least one algorithm.

In one embodiment, the system 100 may determining a distance from a location of a device on a route to a checkpoint location on the route based, at least in part, on mapping data associated with the route. In one use case scenario, a user may indicate, via a navigation device (e.g., a UE 101, the navigation device 111, etc.), on a map application a desired destination location, wherein the navigation module 119 may determine one or more possible routes to the destination based on mapping data. In one embodiment, the mapping data is available on the device, via one or more service providers, via one or more content providers, or a combination thereof. Further, once the user and/or the navigation module 119 select a route, the navigation module 119 may determine various information available for the selected route. For example, a distance from the user's current location to the destination may be determined, a travel time, or a distance from the user's current location to one or more checkpoint locations along the route may be determined, or one or more distances between the one or more checkpoint locations may be determined, and the like. In one embodiment, a checkpoint location may be a point along the route where the user may be able to take one or more actions, for example, take an exit off a freeway, or make a right/left turn onto another road, or make a U-turn, and the like. In one embodiment, there may be one or more sub-destinations identified by the user, wherein a sub-destination may be a planned stop for the user. For example, a stop at a market location when traveling from a user's workplace to the user's home.

In one embodiment, the system 100 may process and/or facilitate a processing of telematics information, sensor information, or a combination thereof associated with at least one vehicle to determine an estimated location of the vehicle. In one embodiment, a navigation device may access/request and process various data available from one or more sensors/instruments, wherein the data may be associated with a vehicle and may indicate a travel distance, speed, and/or direction. In one embodiment, the telematics information indicates, at least in part, a location of the vehicle, a movement of the vehicle, a status of the vehicle, or a combination thereof. For example, various instruments/sensors may indicate movements of the vehicle, for example, an in-vehicle odometer sensor may indicate a distance traveled by the vehicle, or a speedometer sensor may indicate a travelling speed of the vehicle, or a steering control sensor may indicate an angle and direction of the steering wheels on the vehicle, etc., where a navigation device may utilize the information to estimate a current location of the vehicle with respect to the known initial location of the vehicle. In one embodiment, speedometer information (speed) of the vehicle may be compared to the speed of other nearby vehicles (e.g., traffic speed) and to information about speed limit at the current location as an information item, which may be used as positioning information. For example, a vehicle would not be traveling at 120 km/h on a road, which may be parallel to a highway. In one use case scenario, a vehicle may start traveling from a known location "A," when one or more instruments/sensors may provide data indicating that the vehicle may be traveling in one or more directions (e.g., left turn, right turn, South, East, West, etc.), at one or more speeds, and for a certain distance. Further, the navigation device may use the data to estimate as to where the vehicle may be located at a given time based on the initial location information and available mapping data. In one embodiment, the estimated location is based, at least in part, on the vehicle location history, a user history, or a combination thereof. For example, the navigation device may compare a current estimated location to history information associated with the vehicle, with the navigation device, with a user, and the like. In one instance, the user history may indicate that a current estimated location is a POI (e.g., a restaurant), which the user visited last week.

In one embodiment, the system 100 may cause, at least in part, a comparison of the estimated location against mapping data. In one embodiment, the mapping data is available via an in-vehicle system, via one or more devices in the vehicle, via one or more service providers, via one or more content providers, or a combination thereof. In one embodiment, a navigation device may compare the estimated location information of a vehicle to mapping data, which may be available via an in-vehicle system and/or the navigation device may access/request the mapping data from one or more other devices and/or external sources (e.g., a service provider.) For example, the navigation device may compare the estimated location to the mapping data to determine if the estimated location can be identified on the mapping data. In one instance, from an initial location, the vehicle may have traveled away two miles in a southeast direction while making several left and/or right turns, in which case the navigation device can estimate the location of the vehicle on a mapping application.

In one embodiment, the system 100 may determine whether to determine a sensed location of the vehicle via one or more location sensors based, at least in part, on the comparison. In one embodiment, the comparison indicates a potential deviation, an accuracy, or a combination thereof of the estimated location with reference to the mapping data. In one embodiment, a navigation device may evaluate the potential deviation and/or the accuracy of the estimated location against a threshold in order to determine if the estimated location is within an acceptable margin of error. For example, to determine if the estimated current location is on a proper route (e.g., a road, a street, etc.) in the mapping data or if the current location is estimated to be at an improper/unreasonable point in the mapping data, for instance, off the road in a canyon, where the route was supposed to be on a certain road. In one embodiment, if the potential deviation and/or the accuracy meet the threshold, then the navigation device may access, request, and/or acquire a more accurate positioning data (sensed location) from one or more external sources. In one embodiment, the sensed location is determined based, at least in part, on data from a satellite-based navigation system, a network-assisted navigation system, one or more external sensors, or a combination thereof. In one embodiment, the navigation device may sense the positioning data for a predetermined amount of time, or an event (e.g., locate a major route, locate a known POI, locate a known landmark, etc.) In one embodiment, the sensors may be used to determine virtual landmarks, which may include sensors placed in the road (e.g., RFID sensors in the asphalt), on the side of the road, on a bus stop sign/station, on road crossings, close to real landmarks, and the like. In one embodiment, if the navigation device does not or cannot identify an expected sensor or landmark, then the navigation system may be triggered to utilize one or more location sensors for obtaining accurate location information.

In one embodiment, the system 100 may cause, at least in part, an activation of the one or more location sensors based, at least in part, on the potential deviation, the accuracy, or a combination thereof. In one embodiment, the navigation device may determine to activate one or more location sensors based on the potential deviation, the accuracy. For example, if the deviation is more than 100-meters, than activate one or more location sensors. In one embodiment, the activation of the one or more location sensors is based, at least in part, on a power level associated with the vehicle, one or more devices associated with the vehicle, or a combination thereof. In one embodiment, the navigation device and/or an in-vehicle system may determine one or more power levels associated with the vehicle and/or the navigation device for activating the one or more location sensors.

In one embodiment, the system 100 may determine a travel route based, at least in part, on a user input. In various embodiments, a navigation device may determine one or more travel routes for one or more users via a UI (e.g., on the navigation device), one or more other devices (e.g., a mobile device), one or more applications (e.g., a calendar application on a mobile device in the vehicle), and the like.

In one embodiment, the system 100 may cause, at least in part, the activation of the one or more location sensors based, at least in part, on the travel route, a destination, a threshold associated with the potential deviation, a threshold associated with the accuracy, or a combination thereof. In one embodiment, a navigation device may cause the activation based on determining one or more characteristics for a travel route, for example, whether the travel route is via an unfamiliar area for the user, or whether the destination type/location may indicate an urgency to reach the destination; for example, a hospital, an airport, a train station, a wedding hall, etc. In various embodiments, the navigation device may cause the activation based on the potential deviation and/or the accuracy thresholds. For example, the one or more location sensors may be activated based on whether the potential deviation is greater than a threshold, or whether the accuracy is less than a threshold, and the like.

In one embodiment, the system 100 may determine directional information of the vehicle based, at least in part, on data from one or more sensors associated with a steering control of the vehicle. In one embodiment, a navigation device may request/receive data from one or more steering control sensors of a vehicle so that a one or more directional information items may be determined. For example, the steering control sensors may indicate an angle and direction of the vehicle's steering wheels, steering column, steering wheel, and the like, so that the navigation device and/or one or more other devices may ascertain one or more changes in traveling direction of the vehicle. In one embodiment, the change of travel direction may be continuously compared to available mapping data and/or the comparison may be done if the steering control sensors detect a change of direction.

In one embodiment, the system 100 may cause, at least in part, an update to the estimated location based, at least in part, on the directional information. In one embodiment, the navigation device may cause an update to the estimated location of the vehicle based on the directional information determined via the one or more steering control sensors. In one embodiment, the estimated location may be continuously presented to the user via a UI on one or more devices available in the vehicle.

In one embodiment, the system 100 may cause, at least in part, a monitoring of a current location of the device on the route based, at least in part, on a direction and a distance traveled by the device. In one embodiment, the navigation module 119 may utilize one or more sensors and/or modules (e.g., a magnetometer) associated with the navigation module 119 and/or a host device to determine a direction and a distance of travel for presenting a current location of a device (e.g., a vehicle) via a UI. For example, the navigation module 119 can use the travel direction information to determine whether the device is at least traveling in the direction of a checkpoint and/or a destination point on a determined route.

In one embodiment, the system 100 may cause, at least in part, a presentation of the current navigation location. In one embodiment, the navigation module 119 may determine and present a current position of a host device (e.g., a vehicle) and cause a presentation of the current location and/or traveling direction on a map application, wherein the current location and traveling direction may be determined based on information determined substantially locally.

In one embodiment, imaging and/or audio samples (e.g., video, pictures, etc.) may be utilized to assist in determining a current location. For instance, a camera and a microphone on a UE 101 and/or on the vehicle may be used to capture a video, audio, and/or image sample of the street-view imagery (e.g., image detection), where the captured samples may be analyzed locally (e.g., at UE 101) or may be transmitted to a service provider (e.g., cloud services) so that the audio and/or the image samples may be used to determine a current location, for example, an initial location of the user. In one embodiment, the audio and image samples may be pre-processed at the UE 101 so that an optimized amount data may be available for transmission to the cloud services while the samples still include valid, accurate, and useful data. In one scenario, a UE 101 may be mounted in the vehicle at a position so that the camera of the UE 101 may capture the image and/or audio samples of the street-view. In one use case, the image and/or audio samples may be utilized to determine location information where a UE 101 may not be equipped with GPS sensors and/or when the UE 101 cannot receive the GPS data (e.g., in a building, in a tunnel, no GPS, etc.) In one use case, a UE 101 and the image and/or audio samples may be utilized for determining location and travel direction information for a user while walking in an area, while in a building, and the like, wherein the location and direction information may be utilized to calibrate one or more sensors on the UE 101.

Although various embodiments are discussed with respect to providing mechanisms to minimize power consumption in a navigation system while allowing for various levels of functionality and accuracy, it is contemplated that embodiments of the approach described herein are applicable to any type of sensory data including environmental, physical properties, material, location sensors, user device, and the like. In one embodiment, the sensory data refers, for instance, to data that indicates state of a sensor or an instrument, state of a user device, a vehicle, or user environment and/or the inferred state of the sensor or the instrument, of the user device, of the vehicle, or of the user.

By way of example, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs can support any type of interface to the user (such as "wearable" circuitry, etc.). Further, the UEs 101 may include various sensors for collecting data associated with a vehicle, a user, a user's environment, and/or with a UE 101, for example, the sensors may determine and/or capture audio, video, images, atmospheric conditions, device location, user mood, ambient lighting, user physiological information, device movement speed and direction, and the like.

By way of example, the UEs 101, the service provider 105, the content providers 107, and the instruments 109 may communicate with each other and other components of the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, one or more entities of the system 100 may interact according to a client-server model with the applications 103 and/or the DC module 117 of the UE 101. According to the client-server model, a client process sends a message including a request to a server process, and the server process responds by providing a service (e.g., context-based grouping, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
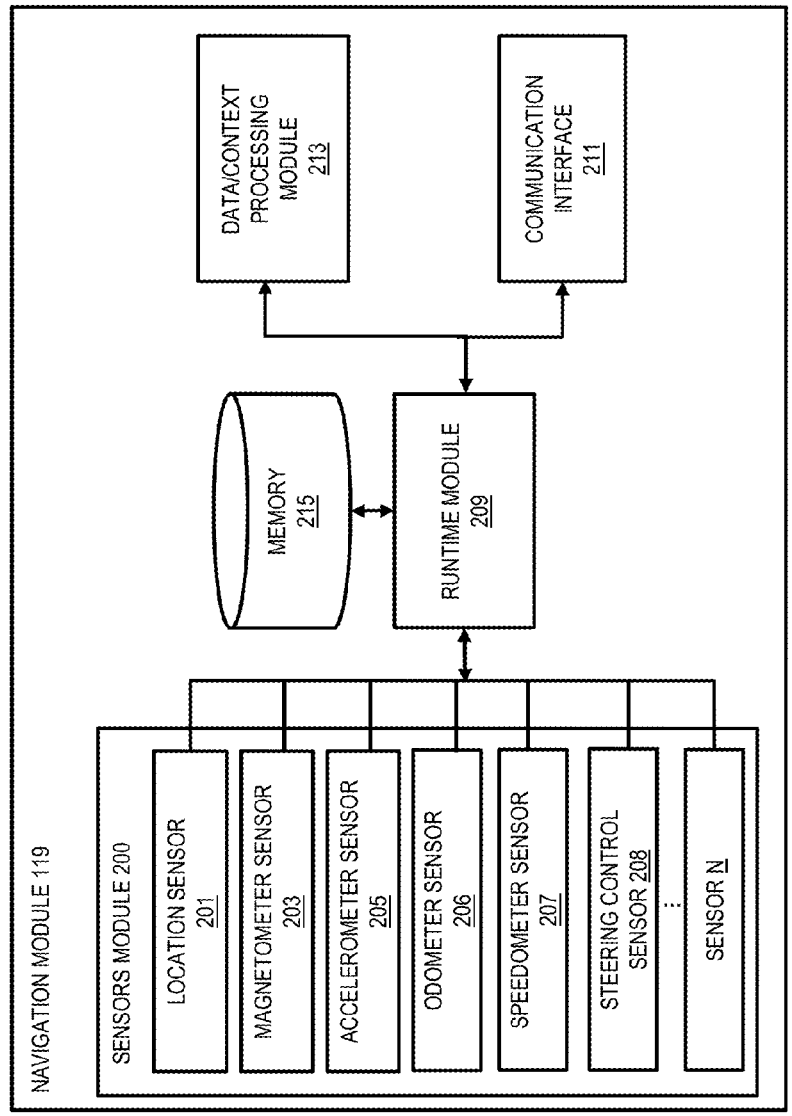
FIG. 2 is a diagram of the components of a navigation module capable of determining and presenting navigational information associated with a device, according to various embodiments.

FIG. 2 is a diagram of the components of a navigation module capable of determining and presenting navigational information associated with a device, according to various embodiments. By way of example, the navigation module 119 includes one or more components for receiving, collecting, generating, determining, and/or analyzing navigational data associated with various sensors and/or instruments of a vehicle. It is contemplated that the functions of these components may be combined in one or more components or performed by other components of equivalent functionality. In this embodiment, the navigation module 119 includes sensors module 200 that may include one or more sensors, for example, a location sensor 201, a magnetometer sensor 203, an accelerometer sensor 205, an odometer sensor 206, a speedometer sensor 207, a steering control sensor 208, and/or one or more other sensors N. The sensors N may include one or more other types of sensors, for example, for detecting audio, video, environmental conditions, vibration, and the like. Further, the navigation module 119 may also include a runtime module 209 to coordinate the use of other components of the navigation module 119, for example, a communication interface 211, a data/context processing module 213, and memory 215. The navigation module 119 may include various applications, software, and/or algorithms, which may be executed on the runtime module 209, and/or the navigation module 119 may utilize resources of a host device, for example, a UE 101, a navigation device 111, a vehicle's onboard electronics system, and/or other components of the system 100.

The location sensor 201 can determine a device's location, for example, location of a UE 101. The device's location may be determined by a triangulation system such as a satellite-based positioning system (e.g., GPS, GLEANS, etc.), a network assisted positioning system (e.g., A-GPS), Cell of Origin, or other location extrapolation technologies. Standard GPS, GLEANS, and A-GPS systems can use satellites 113 to pinpoint the location of a device. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location sensor 201 may also utilize multiple technologies to detect the location of the UE 101. Location coordinates (e.g., satellite-based positioning coordinates) can give finer detail as to the location of the UE 101 when media is captured. In one embodiment, satellite-based positioning coordinates are stored as context information in the memory 215 and are available to the navigation module 119, the service provider 105, and/or to other entities of the system 100 via the communication interface 211. Moreover, in certain embodiments, the satellite-based positioning coordinates can include an altitude to provide a height. In other embodiments, the altitude can be determined using another type of altimeter. In certain embodiments, the location sensor 201 can be a means for determining a location of the UE 101, an image, or used to associate an object in view with a location.

The magnetometer sensor 203 can be used in finding horizontal orientation of a device. A magnetometer is an instrument that can measure the strength and/or direction of a magnetic field. Using the same approach as a compass, the magnetometer is capable of determining the direction of a device using the magnetic field of the Earth. The front of a media capture device (e.g., a camera) can be marked as a reference point in determining direction. Thus, if the magnetic field points north compared to the reference point, the angle the device (e.g., a UE 101, a vehicle, a navigation device, etc.) reference point is from the magnetic field is known. Simple calculations can be made to determine the direction of the device associated with the magnetometer. In one embodiment, horizontal directional data obtained from a magnetometer can be stored in memory 215, made available to other sensors, modules, and/or applications, for example, at the UE 101, at the navigation device 111, and/or transmitted via the communication interface 211 to one or more entities of the system 100.

The accelerometer sensor 205 can be used to determine vertical orientation of a device. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer sensor 205 can determine the angle the UE 101 is pointed as compared to Earth's gravity. In certain embodiments, the magnetometer sensor 203 and accelerometer sensor 205 can be means for ascertaining a perspective of a user. This perspective information may be stored in the memory 215, made available to other modules and/or applications at the UE 101, at the navigation device 111, and/or sent to one or more entities of the system 100.

The odometer sensor 206 can be used to determine a distance traveled, for example, by a vehicle. In one embodiment, the odometer sensor 206 may request and odometer information from a vehicle's odometer sensor and/or instrument, wherein the information may be actual odometer readings and/or may be such data that the navigation module 119 may process for determining odometer information of the vehicle. In one embodiment, distance traveled by a user may be determined from a pedometer device utilized by the user.

The speedometer sensor 207 can be used to determine a speed at which a vehicle (or person) may be travelling at, wherein the speed may be present in different distance and time measuring units. For example, a speed of a vehicle may be presented in miles-per-hour (mph), miles-per-minute, kilometer-per-hour (km/h), meters-per-second, and the like. In one embodiment, speed information may be determined by utilizing odometer information associated with a vehicle or a user to determine a distance traveled in a given amount of time. For example, an odometer reading indicates a distance of one-mile that was traveled in one minute, which would indicate a speed of one-mph or 60-mph. Conversely, a distance traveled may be determined from available information from a speedometer sensor and a duration of time that a vehicle or a user traveled at that speed. For example, if speedometer information indicates a speed of 100 km/h and a vehicle traveled for 30 minutes at that speed, then the distance traveled by the vehicle would be 50 km (100 km/h×0.5 hrs.) In one embodiment, one or more variations in speed of a vehicle may be tracked and correlated to a duration of time that the vehicle traveled at a specific speed. For example, a vehicle travels at 100 km/h for 15 minutes (resulting in a distance of 25 km) and then travels at 90 km/h for 10 minutes (resulting in a distance of 15 km), wherein the total distance traveled would be 40 km during the 25-minute travel. Moreover, a given speed information for a given duration of time at the speed may be utilized to instantly and/or continuously calculate a traveled distance, for example, feet-per-seconds, meters-per-seconds, and the like.

The steering control sensor 208 may provide one or more information items for determining directional information associated with a steering control of a vehicle. For example, the steering control sensor 208 may be associated with a steering wheel of a vehicle, or may be associated with steering wheels/mechanisms (e.g., front wheels, back wheels, etc.) of a vehicle, or may be associated with a steering column/connection of the vehicle to the steering wheels and/or the steering wheel, and the like. In one embodiment, the steering control sensor 208 may be have wireless and/or wired connection to the steering control of the vehicle, wherein it may determine a turning radius, a wheel angle, a directional turn, and the like. In one embodiment, the steering control sensor 208 may also determine one or more turn signals, for example left/right, and correlated the turn signals with the data determined by the steering control sensor 208.

In various embodiments, the one or more other sensors N may include various sensors for detecting and/or capturing data associated with the user and/or a host device. For example, various sensors N may include sensors for capturing environmental (e.g., atmospheric) conditions, audio, video, images, temperature, user physiological data, user mood (e.g., hungry, angry, tired, etc.), user interactions with the UEs 101, with the navigation device 111, and the like. In certain embodiments, information collected from and/or by the navigation module 119 may be retrieved by the runtime module 209, stored in memory 215, made available to other, sensors, modules, and/or applications at the UE 101, at the navigation device 111, and/or sent to one or more entities of the system 100.

In one embodiment, the communication interface 211 can be used to communicate with a host device, a host system, and/or one or more entities of the system 100. Certain communications can be via methods such as an internet protocol, messaging (e.g., SMS, MMS, etc.), or any other communication method (e.g., via the communication network 115). In some examples, the navigation module 119 may send and/or receive various sensor data to and from other sensors, other modules, other devices, and the like, for example, to and/or from a UE 101, the navigation device 111, the service providers 105, the content providers 107, and/or to other entities of the system 100.

The data/context processing module 213 may be utilized in determining context information from the sensors module 200, the UE 101, the navigation device 111. For example, it can determine user activity, vehicle type, in-vehicle available instruments, application and/or service utilization, user information, type of information included in the data, information that may be inferred from the data, and the like. The data may be shared with a host device (e.g., the UE 101 applications 103), and/or caused to be transmitted, via the communication interface 211, to the service provider 105 and/or to other entities of the system 100. The data/context processing module 213 may additionally be utilized as a means for determining information related to the user, a vehicle, instruments, sensors, gauges, various data, the UEs 101, and the like. Further, data/context processing module 213, for instance, may manage (e.g., organizes) the collected data based on general characteristics, rules, logic, algorithms, instructions, etc. associated with the data. In certain embodiments, the data/context processing module 213 can infer higher level context information from the context data such as favorite locations, significant places, common activities, interests in products and services, etc.

In one embodiment, the sensors module 200 may determine and/or set an operation mode of one or more sensors based, at least in part, on one or more parameters, configurations, requirements, settings, and the like, which may be provided by a host device, a service provider, and/or a user. In one user case scenario, the navigation module 119 may be implemented in a navigation device 111, wherein a power management setting may indicate that one or more of the sensors of the navigation module may need to be put into a sleep mode, a suspend mode, an active mode, a hybrid mode, and the like. In one embodiment, a user may determine and select a mode of operation for the one or more sensors in the sensors module 200.

Figure 3:
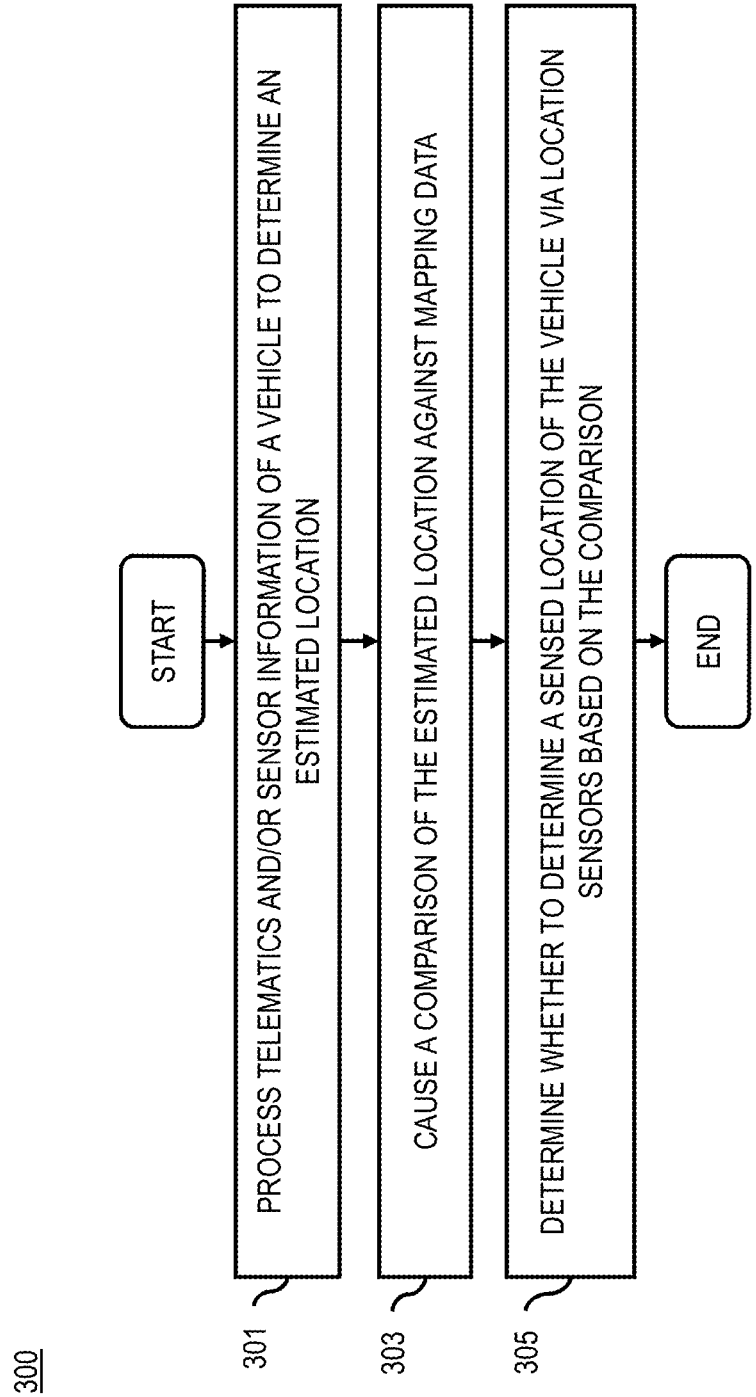
FIGS. 3 and 4 illustrate flowcharts of various processes for, at least, mechanisms to minimize power consumption in a navigation system while allowing for various levels of functionality and accuracy, according to various embodiments.
Figure 4:
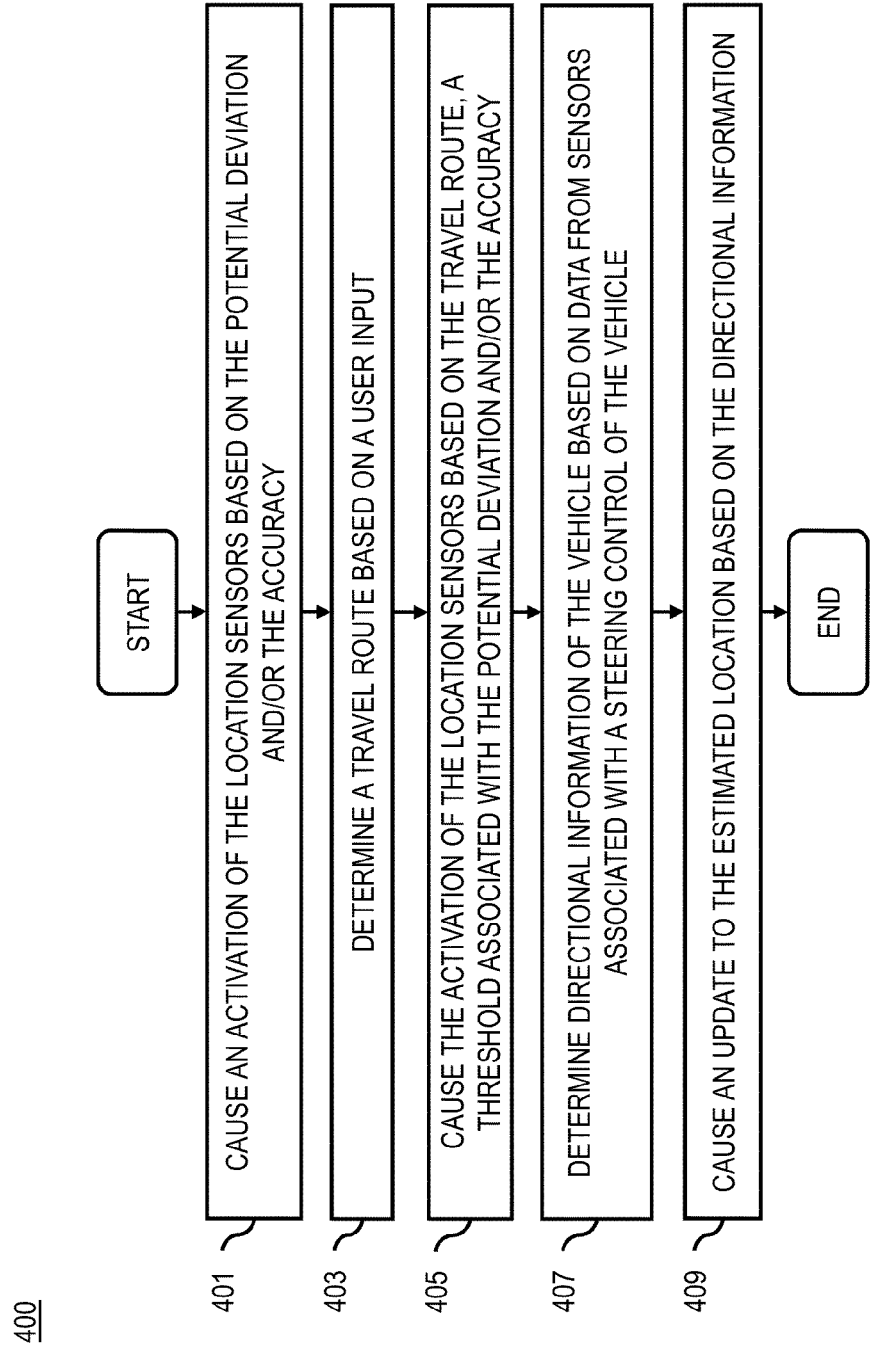
Figure 9:
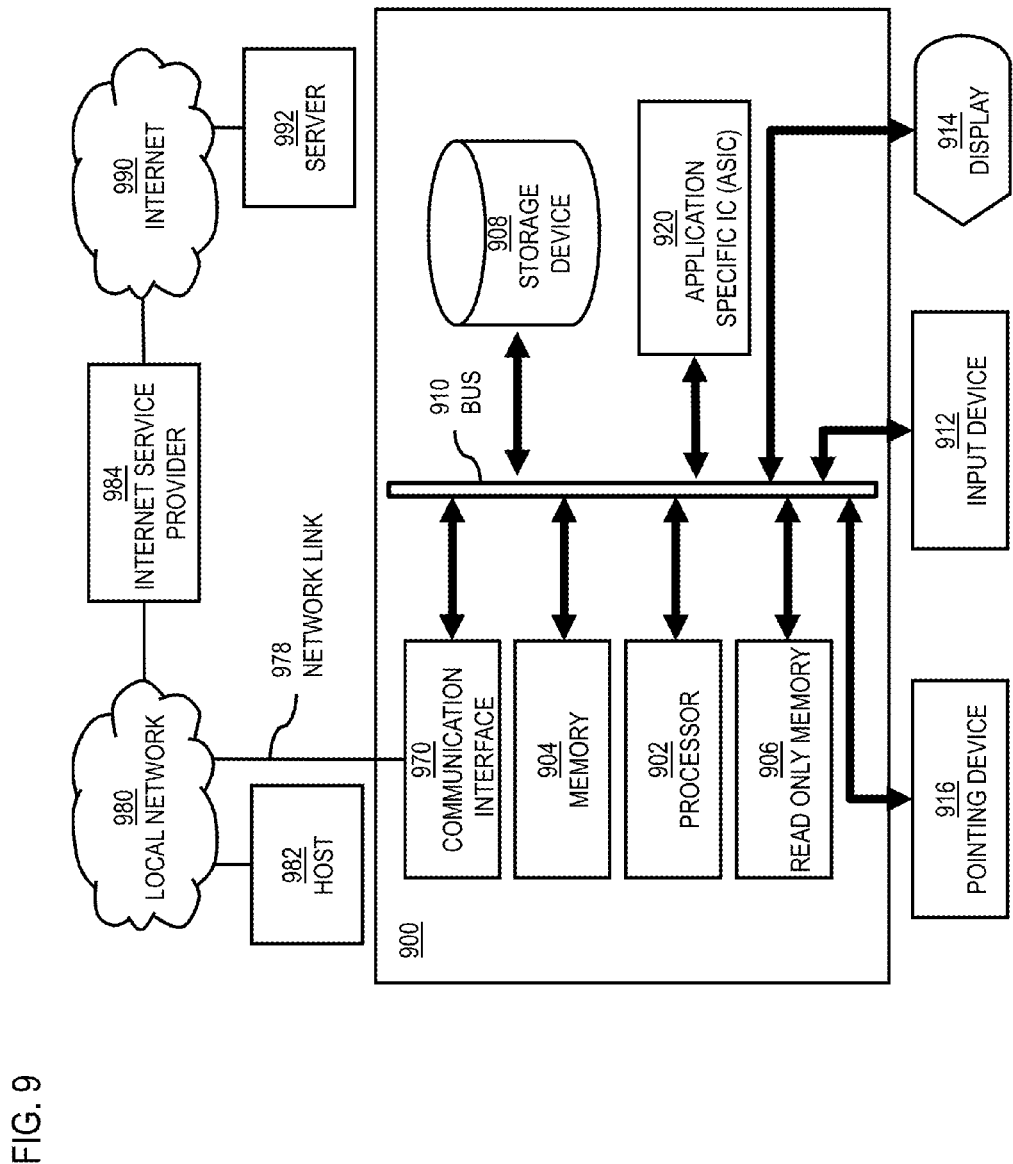
FIG. 9 is a diagram of hardware that can be used to implement an embodiment of the invention.

FIGS. 3 and 4 illustrate flowcharts of various processes for, at least, mechanisms to minimize power consumption in a navigation system while allowing for various levels of functionality and accuracy, according to various embodiments. In various embodiments, the navigation module 119, the applications 103, the DC module 117, and/or the navigation device 111 may perform processes 400 and 500 that may be implemented in, for instance, a chip set including a processor and a memory as shown in FIG. 9. As such, the applications 103, the navigation module 119 can provide means for accomplishing various parts of the process 400 and 500 as well as means for accomplishing other processes in conjunction with other components of the system 100. Throughout these processes, the applications 103, the DC module 117, and/or the navigation module 119 may be referred to as completing various portions of the processes 400 and 500, however, it is understood that other components of the system 100 can perform some of and/or all of the process steps. Further, in various embodiments, navigation module 119 may be implemented in one or more entities of the system 100.

Referring to FIG. 3, the process 300 begins at step 301 where the navigation module 119 processes and/or facilitates a processing of telematics information, sensor information, or a combination thereof associated with at least one vehicle to determine an estimated location of the vehicle. In one embodiment, a navigation device may access/request and process various data available from one or more sensors/instruments, wherein the data may be associated with a vehicle and may indicate a travel distance, speed, and/or direction. In one embodiment, the telematics information indicates, at least in part, a location of the vehicle, a movement of the vehicle, a status of the vehicle, or a combination thereof. For example, various instruments/sensors may indicate movements of the vehicle, for example, an in-vehicle odometer sensor may indicate a distance traveled by the vehicle, or a speedometer sensor may indicate a travelling speed of the vehicle, or a steering control sensor may indicate an angle and direction of the steering wheels on the vehicle, etc., where a navigation device may utilize the information to estimate a current location of the vehicle with respect to the known initial location of the vehicle. In one embodiment, speed information of the vehicle may be compared to the speed of other nearby vehicles (e.g., traffic speed) and to information about speed limit at the current location road as an information items which may be used as positioning information. For example, a vehicle would not be traveling at 120 km/h on a road which may be parallel to a highway. In one use case scenario, a vehicle may start traveling from a known location "A," when one or more instruments/sensors may provide data indicating that the vehicle may be traveling in one or more directions (e.g., left turn, right turn, South, East, West, etc.), at one or more speeds, and for a certain distance. Further, the navigation device may use the data to estimate as to where the vehicle may be located at a given time based on the initial location information and available mapping data. In one embodiment, the estimated location is based, at least in part, on the vehicle location history, a user history, or a combination thereof. For example, the navigation device may compare a current estimated location to history information associated with the vehicle, with the navigation device, with a user, and the like. In one instance, the user history may indicate that a current estimated location is a POI (e.g., a restaurant), which the user visited last week.

In step 303, the navigation module 119 causes, at least in part, a comparison of the estimated location against mapping data. In one embodiment, the mapping data is available via an in-vehicle system, via one or more devices in the vehicle, via one or more service providers, via one or more content providers, or a combination thereof. In one embodiment, a navigation device may compare the estimated location information of a vehicle to mapping data, which may be available via an in-vehicle system and/or the navigation device may access/request the mapping data from one or more other devices and/or external sources (e.g., a service provider.) For example, the navigation device may compare the estimated location to the mapping data to determine if the estimated location can be identified on the mapping data. In one instance, from an initial location, the vehicle may have traveled away two miles in a south-east direction while making several left and/or right turns, in which case the navigation device can estimate the location of the vehicle on a mapping application.

In step 305, the navigation module 119 determines whether to determine a sensed location of the vehicle via one or more location sensors based, at least in part, on the comparison. In one embodiment, the comparison indicates a potential deviation, an accuracy, or a combination thereof of the estimated location with reference to the mapping data. In one embodiment, a navigation device may evaluate the potential deviation and/or the accuracy of the estimated location against a threshold in order to determine if the estimated location is within an acceptable margin of error. For example, to determine if the estimated current location is on a proper route (e.g., a road, a street, etc.) in the mapping data or if the current location is estimated to be at an improper/unreasonable point in the mapping data, for instance, off the road in a canyon, where the route was supposed to be on a certain road. In one embodiment, if the potential deviation and/or the accuracy meets the threshold, then the navigation device may access, request, and/or acquire a more accurate positioning data (sensed location) from one or more external sources. In one embodiment, the sensed location is determined based, at least in part, on data from a satellite-based navigation system, a network-assisted navigation system, one or more external sensors, or a combination thereof. In one embodiment, the navigation device may sense the positioning data for a predetermined amount of time, or an event (e.g., locate a major route, locate a known POI, locate a known landmark, etc.) In one embodiment, the sensors may be used to determine virtual landmarks, which may include sensors placed in the road (e.g., RFID sensors in the asphalt), on the side of the road, on a bus stop sign/station, on road crossings, close to real landmarks, and the like. In one embodiment, if the navigation device does not or cannot identify an expected sensor or landmark, then the navigation system may be triggered to utilize one or more location sensors for obtaining accurate location information.

Referring to FIG. 4 now, the process 400 begins at step 401 where the navigation module 119 causes, at least in part, an activation of the one or more location sensors based, at least in part, on the potential deviation, the accuracy, or a combination thereof. In one embodiment, the navigation device may determine to activate one or more location sensors based on the potential deviation, the accuracy. For example, if the deviation is more than 100-meters, than activate one or more location sensors. In one embodiment, the activation of the one or more location sensors is based, at least in part, on a power level associated with the vehicle, one or more devices associated with the vehicle, or a combination thereof. In one embodiment, the navigation device and/or an in-vehicle system may determine one or more power levels associated with the vehicle and/or the navigation device for activating the one or more location sensors.

At step 403, the navigation module 119 determines a travel route based, at least in part, on a user input. In various embodiments, a navigation device may determine one or more travel routes for one or more users via a UI (e.g., on the navigation device), one or more other devices (e.g., a mobile device), one or more applications (e.g., a calendar application on a mobile device in the vehicle), and the like.

At step 405, the navigation module 119 causes, at least in part, the activation of the one or more location sensors based, at least in part, on the travel route, a destination, a threshold associated with the potential deviation, a threshold associated with the accuracy, or a combination thereof. In one embodiment, a navigation device may cause the activation based on determining one or more characteristics for a travel route, for example, whether the travel route is via an unfamiliar area for the user, or whether the destination type/location may indicate an urgency to reach the destination; for example, a hospital, an airport, a train station, a wedding hall, etc. In various embodiments, the navigation device may cause the activation based on the potential deviation and/or the accuracy thresholds. For example, the one or more location sensors may be activated based on whether the potential deviation is greater than a threshold, or whether the accuracy is less than a threshold, and the like.

At step 407, the navigation module 119 determines directional information of the vehicle based, at least in part, on data from one or more sensors associated with a steering control of the vehicle. In one embodiment, a navigation device may request/receive data from one or more steering control sensors of a vehicle so that a one or more directional information items may be determined. For example, the steering control sensors may indicate an angle and direction of the vehicle's steering wheels, steering column, steering wheel, and the like, so that the navigation device and/or one or more other devices may ascertain one or more changes in traveling direction of the vehicle. In one embodiment, the change of travel direction may be continuously compared to available mapping data and/or the comparison may be done if the steering control sensors detect a change of direction.

At step 409, the navigation module 119 causes, at least in part, an update to the estimated location based, at least in part, on the directional information. In one embodiment, the navigation device may cause an update to the estimated location of the vehicle based on the directional information determined via the one or more steering control sensors. In one embodiment, the estimated location may be continuously presented to the user via a UI on one or more devices available in the vehicle.

Figure 5:
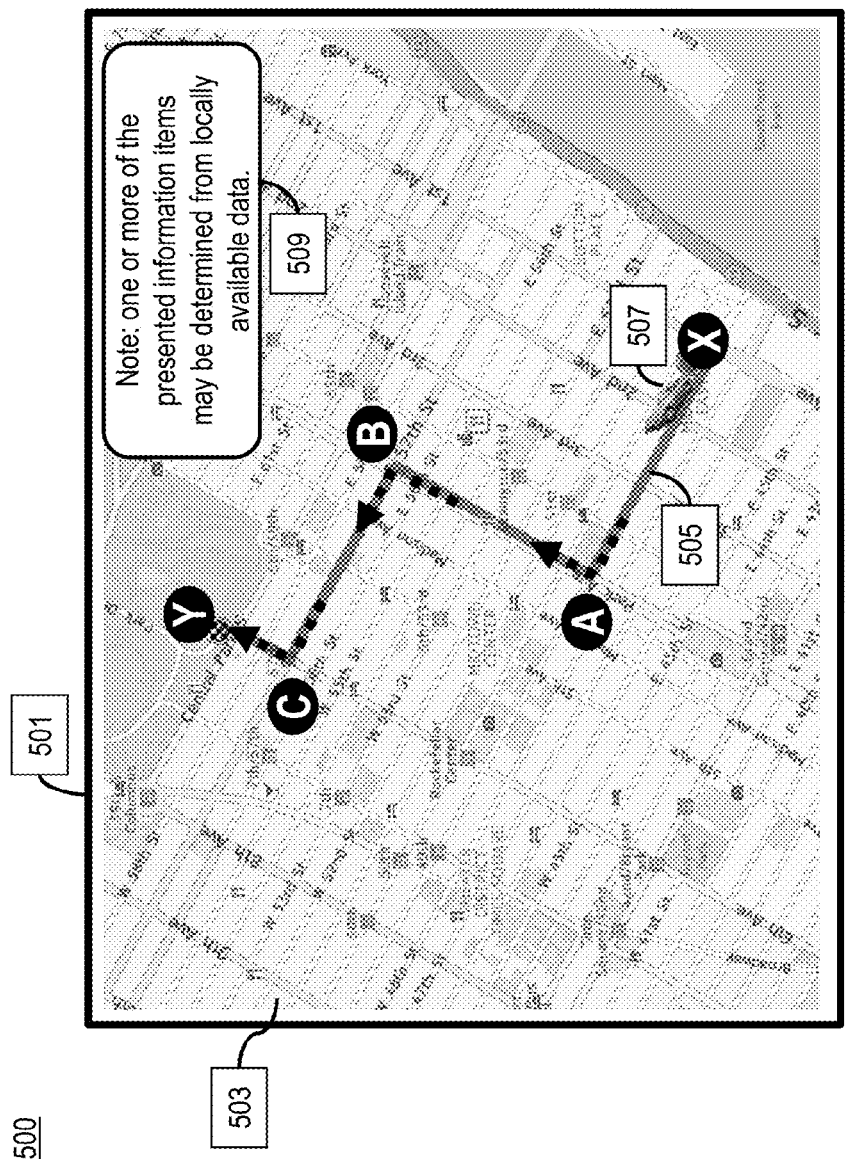
FIGS. 5 through 7 illustrate segments of a map application including navigation route information, according to various embodiments.
Figure 6:
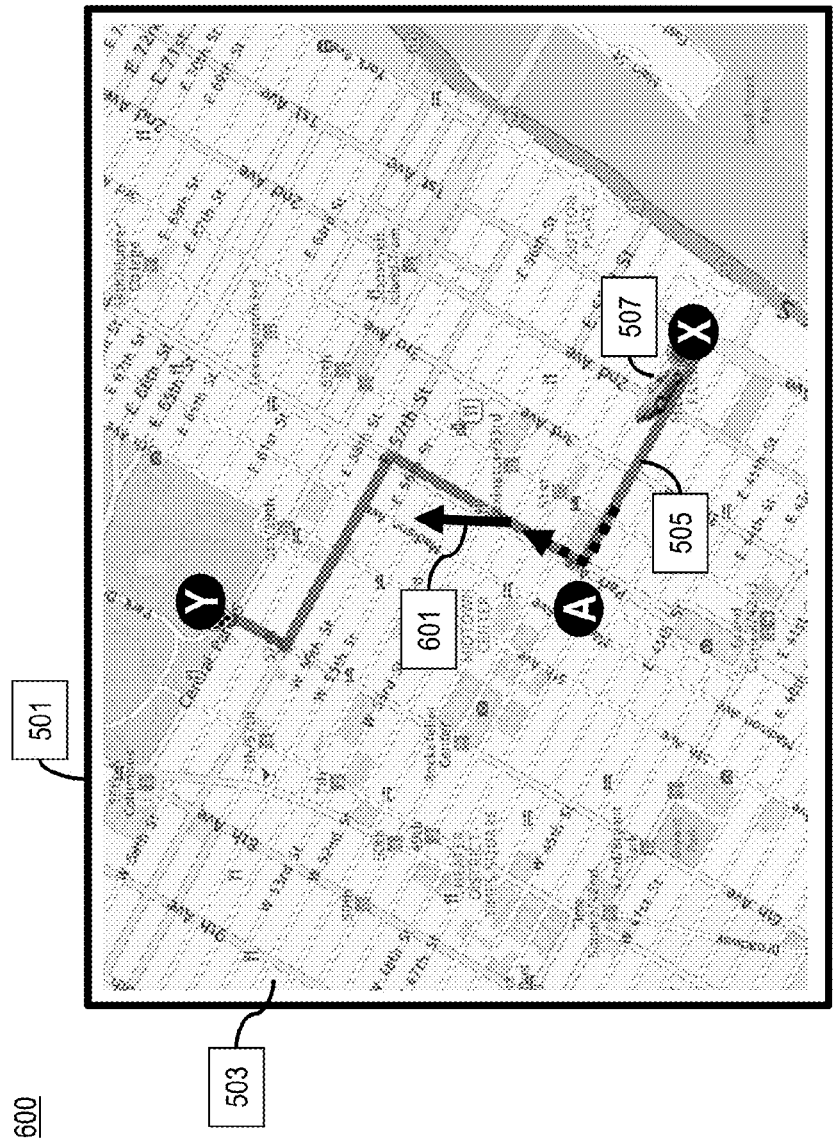

FIGS. 5 and 6 illustrate segments of a map application including navigation route information, according to various embodiments.

FIG. 5 includes UI 500 of a navigation device 501 that presents a map segment 503, which includes a navigation route 505 from a starting location point "X" of a vehicle/device 507 to a destination location point "Y." In one scenario, the navigation module 119 may determine the locations of X and Y and the route 505 from location data available via an external positioning system (e.g., GPS.) In one embodiment, to save power, the navigation module 119 may momentarily deactivate one or more location sensors, for example, that may be associated with one or more navigation devices in the vehicle 507, in the navigation module 119, in a UE 101, and the like. Further, once the vehicle 507 begins travelling/moving from the location X, the navigation module 119 may estimate, update, and present the location information of the vehicle 507 along the route 505 by accessing, requesting, and processing data available from one or more sensors associated with the vehicle 507, a UE 101, and/or available local environmental information (e.g., roadside location sensors, WLAN, etc.) In one embodiment, travel distance, direction, and other sensor information are determined via various sensors associated with the vehicle 507, which are used to determine location of the vehicle 507. In one embodiment, odometer data of the vehicle 507 may be used to determine a travel distance of the vehicle along the route 505. In one embodiment, data from one or more sensors associated with a steering control of the vehicle may be used to determine one or more changes of travel direction, for example, at location points "A" (e.g., a right turn), "B" (e.g., a left turn) and "C" (e.g., a right turn), and the like, wherein the change of travel direction may include gradual turns, 90-degree turns, U-turns, and the like. In one embodiment, the navigation device 501 may present a UI message 509 indicating that the current location information presented may have been determined from available local and sensor information. In one embodiment, the navigation module 119 may predetermine one or more thresholds based on a distance traveled, an elapsed time, reaching a POI, and the like, wherein the one or more deactivated location sensors may be reactivated so that real-time current location information may be accessed or requested from one or more external sources (e.g., GPS, GLEANS, etc.) so that a current location may be determined from that location information.

In FIG. 6, the navigation module 119 may continuously or periodically compare the estimated current location, which may have been estimated based on local data, to mapping data available via the navigation device 501, an in-vehicle system, a UE 101, and the like. In one scenario, the estimated current location may vary from the actual location of the vehicle; for example, when the distance information (e.g., odometer data) is not accurate then the estimation of the traveled distance may be inaccurate. In one instance, current location and travel direction 601 indicates that the estimated location is deviating from the route 505 and the mapping data, where, for example, the mapping data may indicate that there is no road at the estimated location and travel direction. In one embodiment, the estimated location deviation may be due to an accident, a road-block, a detour, and the like, where information on reasons of the deviation may be valuable and may be shared with the local authorities and/or other nearby users. In one embodiment, the navigation module 119 may analyze the comparison results and compare it to one or more deviation and/or accuracy thresholds, wherein if the comparison results meet the threshold then one or more location sensors may be activated to request or access real-time location data from one or more external sources. For example, the location sensors may be activated an estimated current location compared to the mapping data deviated by more than 100 meters, or if the estimated current location compared to the mapping data has an accuracy rate of less than 90%.

Figure 7:
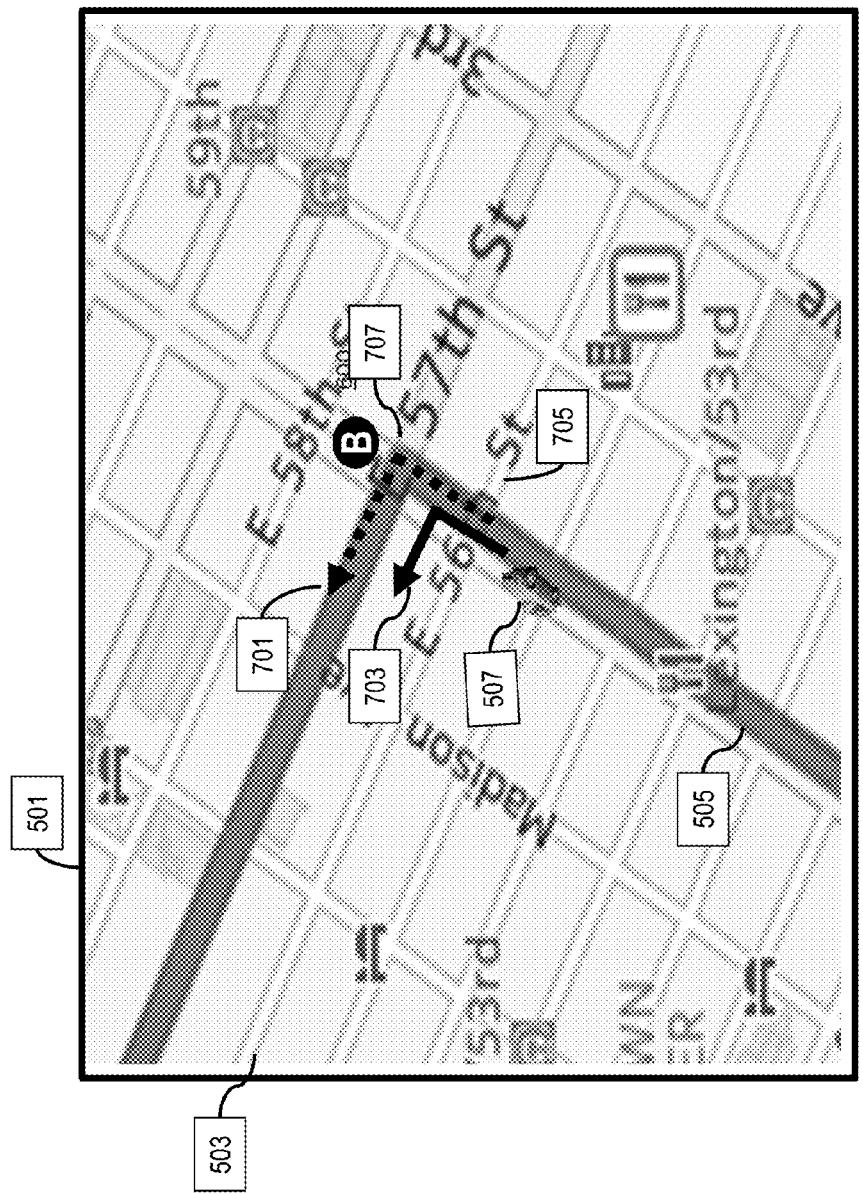

In FIG. 7, the navigation device 501 presents a current location of the vehicle 507 on the route 505 on the mapping application 503, wherein the route includes a left-turn 701 at point "B" along the route 505. In one scenario, the navigation module 119 detects, via one or more sensors, a left-turn 703 by the vehicle 507; however, when the navigation module 119 compares a current estimated location of the left turn 703 to the route 505 and the mapping data, it can determine that the estimated location of the left-turn 703 does not match to the mapping data. For example, the comparison may at least indicate that the left-turn is estimated to be at a location where the map data indicate there is no road between the two roads 705 and 707, where a left-turn would be substantially impossible. In one embodiment, the navigation module 119 may determine to temporarily activate one or more location sensors based, at least in part, on a deviation and/or an accuracy threshold so that the navigation module 119 may access real-time location information (sensed location) from one or more external sources so an accurate current location may be determined. In one embodiment, accuracy of an estimated location may increase due to one more navigation events, for example, left/right turns as the navigation module 119 may use the navigation events to compare to the available mapping data.

Figure 8:
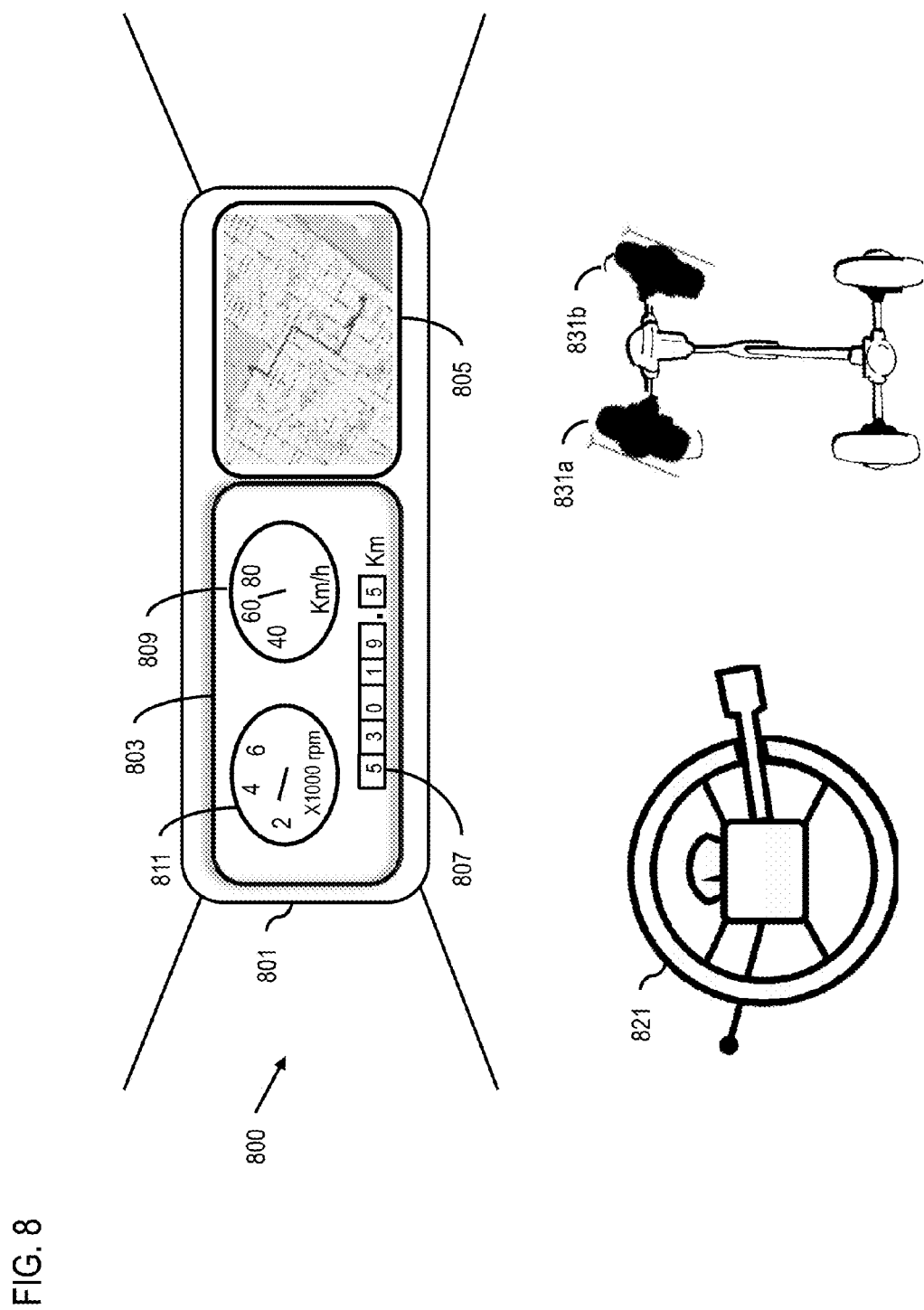
FIG. 8 includes a diagram showing instrumentation and navigation control devices associated with a vehicle, according to an embodiment.

FIG. 8 includes various diagrams showing instrumentation and navigation information associated with a vehicle, according to an embodiment. Diagram 800 shows an instrument panel 801 which includes instruments/gauges 803 and a navigation device 805. The navigation device may utilize one or more location sensors for obtaining external positioning data from one or more service providers and/or the navigation device 805 may communicate with an odometer device 807, a speedometer 809, a tachometer 811, and the like for determining and utilizing in calculation of a device (e.g., vehicle) location. In one embodiment, one or more in-vehicle steering control sensors may be associated with a steering wheel 821 and/or steering wheels 831*a* and 831*b* for determining a change in travel direction of a the vehicle.

The processes described herein for mechanisms to minimize power consumption in a navigation system while allowing for various levels of functionality and accuracy may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide mechanisms to minimize power consumption in a navigation system while allowing for various levels of functionality and accuracy as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing mechanisms to minimize power consumption in a navigation system while allowing for various levels of functionality and accuracy.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing mechanisms to minimize power consumption in a navigation system while allowing for various levels of functionality and accuracy. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing mechanisms to minimize power consumption in a navigation system while allowing for various levels of functionality and accuracy. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing mechanisms to minimize power consumption in a navigation system while allowing for various levels of functionality and accuracy, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 115 for providing mechanisms to minimize power consumption in a navigation system while allowing for various levels of functionality and accuracy.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
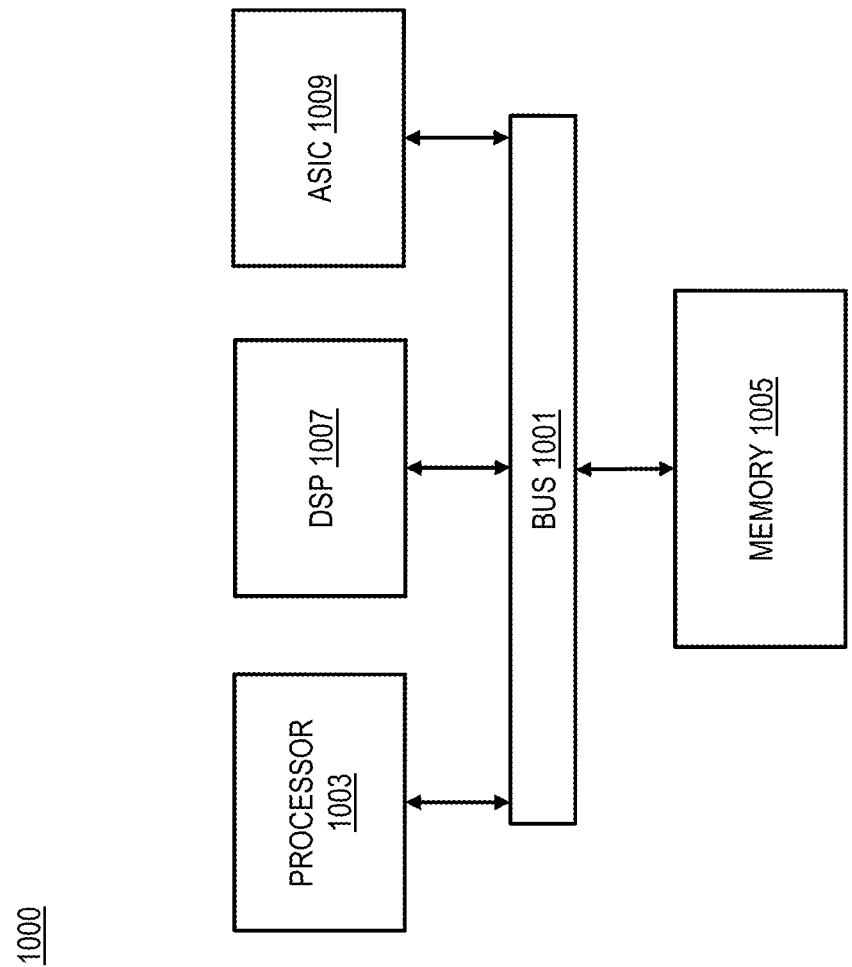
FIG. 10 is a diagram of a chip set that can be used to implement an embodiment of the invention.

FIG. 10 illustrates a chip set or chip 1000 upon which an embodiment of the invention may be implemented. Chip set 1000 is programmed to provide mechanisms to minimize power consumption in a navigation system while allowing for various levels of functionality and accuracy as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing mechanisms to minimize power consumption in a navigation system while allowing for various levels of functionality and accuracy.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to providing mechanisms to minimize power consumption in a navigation system while allowing for various levels of functionality and accuracy. The memory 1005 also stores the data associated with or generated by the execution of the inventive steps.

Figure 11:
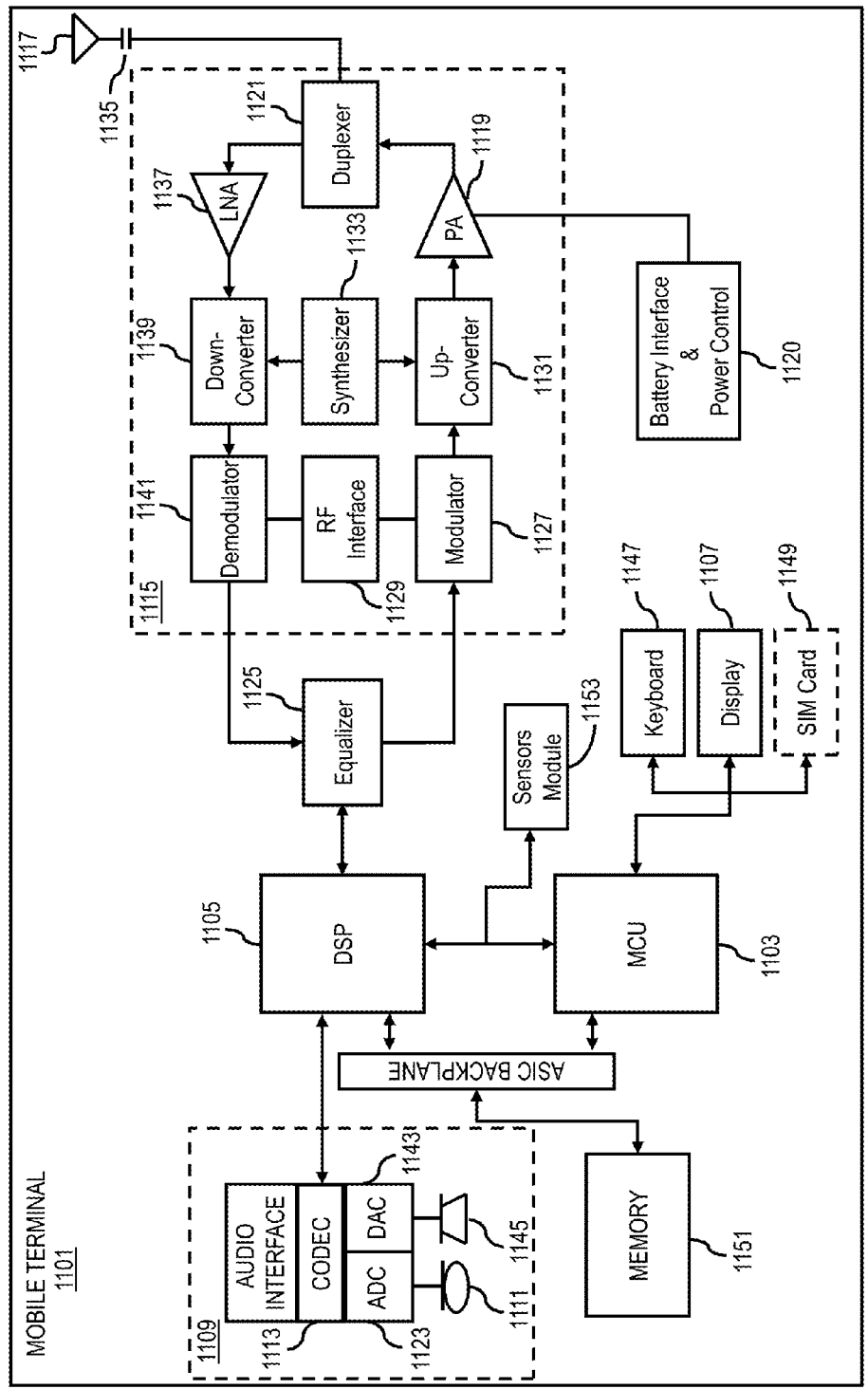
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing mechanisms to minimize power consumption in a navigation system while allowing for various levels of functionality and accuracy. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing mechanisms to minimize power consumption in a navigation system while allowing for various levels of functionality and accuracy. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide mechanisms to minimize power consumption in a navigation system while allowing for various levels of functionality and accuracy. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing, by an apparatus, sensor information from one or more sensors associated with at least one vehicle to determine an estimated location of the vehicle, while one or more other sensors are deactivated, wherein the one or more sensors are attached to the at least one vehicle, and the one or more other sensors include at least one global positioning system receiver built in at least one mobile user device;
comparing, by the apparatus, the estimated location against mapping data to determine a deviation of the estimated location with reference to the mapping data; and
updating, by the apparatus, a location of the vehicle via activating the one or more other sensors when the deviation meets a threshold value.

2. The method of claim 1, wherein the apparatus further processes telematics information associated with the at least one vehicle to determine the estimated location of the vehicle, and the telematics information indicates, at least in part, a location of the vehicle, a movement of the vehicle, a status of the vehicle, or a combination thereof, and wherein the one or more sensors include one or more vehicle diagnostic sensors, one or more vehicle information sensors, or a combination thereof.

3. The method of claim 1, wherein the estimated location of the vehicle is determined based, at least in part, on a vehicle location history, a user history, or a combination thereof, without real-time location data received from a source external to the vehicle, and the deviation indicates an inaccuracy of the estimated location with reference to the mapping data.

4. The method of claim 3, further comprising:
causing, at least in part, an activation of the one or more other sensors based, at least in part, on the deviation, wherein the one or more sensors include one or more magnetometers, one or more accelerometers, one or more odometer sensors, one or more steering control sensors, one or more speedometers, or a combination thereof.

5. The method of claim 4, wherein the activation of the one or more other sensors is further based, at least in part, on a travel route, a destination, a threshold associated with the deviation, or a combination thereof.

6. The method of claim 4, wherein the activation of the one or more other sensors is based, at least in part, on a power level associated with the vehicle, one or more devices associated with the vehicle, or a combination thereof.

7. The method of claim 1, wherein the location of the vehicle is updated by the one or more other sensors based, at least in part, on data from a satellite-based navigation system, a network-assisted navigation system, one or more sensors external to the vehicle, or a combination thereof.

8. The method of claim 1, further comprising:
determining directional information of the vehicle based, at least in part, on data from one or more sensors associated with a steering control of the vehicle, while the one or more other sensors are deactivated; and
updating the estimated location based, at least in part, on the directional information.

9. The method of claim 1, wherein the mapping data is available via an in-vehicle system, via one or more devices in the vehicle, via one or more service providers, via one or more content providers, or a combination thereof, while the one or more other sensors are deactivated.

10. The method of claim 1, wherein the estimated location is determined based, at least in part, on the vehicle location history, a user history, or a combination thereof, while the one or more other sensors are deactivated.

11. An apparatus comprising:
at least one processor; and
at least one memory including computer program code for one or more programs,
the at least one memory and the computer program code configured to, with the at least one processor, cause the apparatus to perform at least the following,
process sensor information from one or more sensors associated with at least one vehicle to determine an estimated location of the vehicle, while one or more other sensors are deactivated, wherein the one or more sensors are attached to the at least one vehicle, and the one or more other sensors include at least one global positioning system receiver built in the at least one mobile user device;
compare the estimated location against mapping data to determine a deviation of the estimated location with reference to the mapping data; and
update a location of the vehicle via activating the one or more other sensors when the deviation meets a threshold value.

12. The apparatus of claim 11, wherein the apparatus further processes telematics information associated with the at least one vehicle to determine the estimated location of the vehicle, and the telematics information indicates, at least in part, a location of the vehicle, a movement of the vehicle, a status of the vehicle, or a combination thereof.

13. The apparatus of claim 11, wherein the deviation indicates an inaccuracy of the estimated location with reference to the mapping data of the estimated location with reference to the mapping data.

14. The apparatus of claim 13, wherein the apparatus is further caused to:
cause, at least in part, an activation of the one or more other sensors based, at least in part, on the deviation.

15. The apparatus of claim 14, wherein the apparatus is further caused to:
determine a travel route based, at least in part, on a user input; and
cause, at least in part, the activation of the one or more other sensors based, at least in part, on a travel route, a destination, a threshold associated with the deviation, or a combination thereof.

16. The apparatus of claim 14, wherein the activation of the one or more other sensors is based, at least in part, on a power level associated with the vehicle, one or more devices associated with the vehicle, or a combination thereof.

17. The apparatus of claim 11, wherein the location of the vehicle is updated by the one or more other sensors based, at least in part, on data from a satellite-based navigation system, a network-assisted navigation system, one or more sensors external to the vehicle, or a combination thereof.

18. The apparatus of claim 11, wherein the apparatus is further caused to:
determine directional information of the vehicle based, at least in part, on data from one or more sensors associated with a steering control of the vehicle; and
cause, at least in part, an update to the estimated location based, at least in part, on the directional information.

19. The apparatus of claim 11, wherein the mapping data is available via an in-vehicle system, via one or more devices in the vehicle, via one or more service providers, via one or more content providers, or a combination thereof.

20. The apparatus of claim 11, wherein the estimated location is based, at least in part, on the vehicle location history, a user history, or a combination thereof.

* * * * *